(12) United States Patent
Fashchik et al.

(10) Patent No.: US 7,770,073 B2
(45) Date of Patent: Aug. 3, 2010

(54) APPARATUS, SYSTEM, AND METHOD FOR RESPONSIVE ACQUISITION OF REMOTE DEBUG DATA

(75) Inventors: Ran Fashchik, Yokneam Ilit (IL); Olympia Gluck, Haifa (IL); Raul Eduardo Saba, Tucson, AZ (US); Warren Keith Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/829,641

(22) Filed: Jul. 27, 2007

(65) Prior Publication Data

US 2009/0031171 A1 Jan. 29, 2009

(51) Int. Cl.
*G06F 11/00* (2006.01)
(52) U.S. Cl. .......................................... 714/48
(58) Field of Classification Search ........................ None
See application file for complete search history.

(56) References Cited

U.S. PATENT DOCUMENTS

| | | | |
|---|---|---|---|
| 6,108,300 A * | 8/2000 | Coile et al. ................. | 370/217 |
| 6,745,344 B1 | 6/2004 | Joshi et al. ................. | 714/38 |
| 6,938,185 B1 | 8/2005 | Bebout et al. .............. | 714/28 |
| 7,337,350 B2 * | 2/2008 | Mimatsu et al. ............ | 714/4 |
| 7,533,295 B2 * | 5/2009 | Gunda et al. ............... | 714/10 |
| 7,543,177 B2 * | 6/2009 | Bullen et al. ............... | 714/6 |
| 2002/0087952 A1 | 7/2002 | Tabe et al. .................. | 717/124 |
| 2004/0123271 A1 | 6/2004 | Bindewald et al. ......... | 717/124 |
| 2004/0243883 A1 | 12/2004 | Shankar et al. ............. | 714/38 |
| 2004/0268177 A1 * | 12/2004 | Ji et al. ...................... | 714/6 |
| 2005/0172271 A1 | 8/2005 | Spertus et al. .............. | 717/125 |
| 2006/0031709 A1 * | 2/2006 | Hiraiwa et al. ............. | 714/5 |
| 2006/0048011 A1 | 3/2006 | Dieffenderfer et al. ..... | 714/38 |
| 2006/0179343 A1 * | 8/2006 | Kitamura .................... | 714/6 |
| 2006/0184831 A1 | 8/2006 | Lesartre et al. ............. | 714/43 |
| 2006/0294592 A1 | 12/2006 | Polyakov et al. ........... | 726/24 |
| 2007/0006154 A1 | 1/2007 | Yang et al. .................. | 717/124 |

* cited by examiner

*Primary Examiner*—Michael C Maskulinski
(74) *Attorney, Agent, or Firm*—Kunzler Needham Massey & Thorpe

(57) ABSTRACT

An apparatus, system, and method are disclosed for responsive acquisition of remote debug data. The apparatus for responsive acquisition of remote debug data is provided with a plurality of modules configured to detect an error on a local device, trigger a remote device to generate a remote debug data set in response to the error, and generate a local debug data set in response to the error. These modules in the described embodiments include a detection module, a trigger module, and a collection module.

17 Claims, 6 Drawing Sheets

APPARATUS, SYSTEM, AND METHOD FOR RESPONSIVE ACQUISITION OF REMOTE DEBUG DATA

BACKGROUND OF THE INVENTION

1. Field of the Invention

This invention relates to database system error identification and more particularly relates to responsive acquisition of remote debug data.

2. Description of the Related Art

Data storage systems often store data that is critical to the operation of corporations or organizations. If lost, such data may create significant problems for such organizations. For example, lost financial information may cost companies significant amounts of money, create tax liabilities, or limit the company's ability to collect on accounts receivable. In certain other companies, such as internet based dot-com companies, lost application data may leave the company in financial ruin. Therefore, companies and organizations wishing to protect critical data often purchase redundant data storage systems.

A typical configuration for a redundant data storage system may include a primary data storage system and one or more backup data storage systems. Often the backup data storage systems are maintained in locations that are geographically remote from the primary storage system. The primary storage system and the remote backup storage system are located separately for added protection. For example, if the primary and the backup systems were stored together at the same location, the backup data would not be protected in the case of a flood, fire, earthquake, or other natural disaster that may destroy the primary. However, if the backup is stored at a remote location, the backup data would likely be unaffected by any natural disaster and the data may survive.

SUMMARY OF THE INVENTION

The present invention has been developed in response to the present state of the art, and in particular, in response to the problems and needs in the art that have not yet been fully solved by currently available database systems. Accordingly, the present invention has been developed to provide an apparatus, system, and method for responsive acquisition of remote debug data that overcome many or all of the above-discussed shortcomings in the art.

The apparatus for responsive acquisition of remote debug data is provided with a plurality of modules configured to detect an error on a local device, trigger a remote device to generate a remote debug data set in response to the error, and generate a local debug data set in response to the error. These modules in the described embodiments include a detection module, a trigger module, and a collection module.

In a further embodiment, the trigger module further comprises a command module configured to issue a debug data collection command to the remote device to generate the remote debug data set. The apparatus may also include a confirmation module in communication with the collection module. The confirmation module may receive an acknowledgement from the remote device, wherein the acknowledgement confirms that the remote device has received the debug data collection command. The command module may issue a second debug data collection command to the remote device in response to a determination that the confirmation module has not received an acknowledgment from the remote device within a predetermined time interval.

The collection module may also generate a local debug data set in response to one of a determination that the confirmation module has received an acknowledgment from the remote device and a determination that a predetermined delay has expired. In a further embodiment, the apparatus may include an analysis module configured to analyze the local debug data set and the remote debug data set to determine a cause of the error.

In an alternative embodiment, the apparatus may receive a debug data collection command from a remote device, send an acknowledgement to the remote device, wherein the acknowledgment is configured to confirm that the receiver module has received the debug data collection command, and generate a debug data set in response to the debug data collection command. Such an apparatus may include a receiver module, an acknowledgement module, and a collection module.

A system of the present invention is also presented for responsive acquisition of remote debug data. The system may include a local device. The local device may detect an error on the local device. Additionally, the local device may trigger a remote device to generate a remote debug data set in response to the error, wherein triggering further comprises issuing a debug data collection command to the remote device to generate the remote debug data set. In a further embodiment, the local device may generate a local debug data set in response to the error.

The system may also include a remote device in communication with the local device. The remote device may receive a debug data collection command from the local device. Additionally the remote device may send an acknowledgement to the local device, wherein the acknowledgment is configured to confirm that the remote device has received the debug data collection command. Finally, the remote device may generate the remote debug data set in response to the debug data collection command.

In a further embodiment, the system may include a network. In such an embodiment, at least one of the debug data collection command and the acknowledgment are communicated between the local device and the remote device over the network. Additionally, the system may include an analyzer configured to receive the local debug data set from the local device and the remote debug data set from the remote device, and to analyze the local debug data set and the remote debug data set to determine a cause of the error.

A method of the present invention is also presented for responsive acquisition of remote debug data. The method in the disclosed embodiments substantially includes the steps necessary to carry out the functions presented above with respect to the operation of the described apparatus and system. In one embodiment, the method includes detecting an error on a local device, triggering a remote device to generate a remote debug data set in response to the error, and generating a local debug data set in response to the error.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
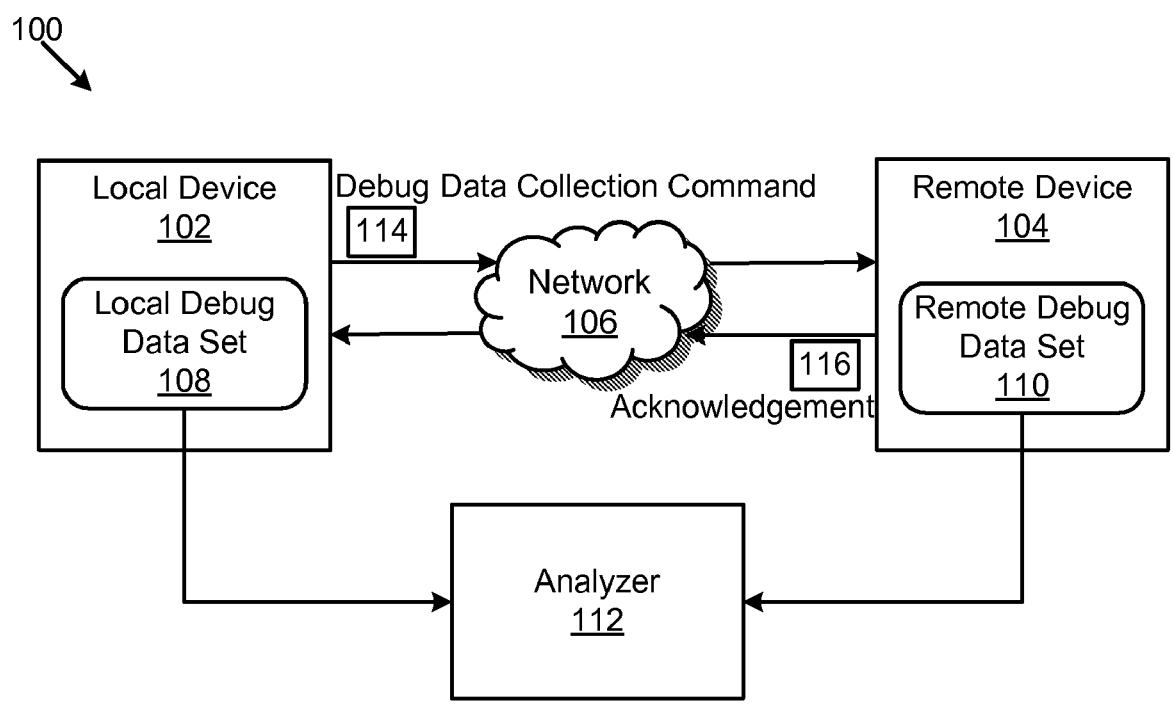
FIG. 1 is a schematic block diagram illustrating one embodiment of a system for responsive acquisition of remote debug data.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

When a system which is based on two or more sites, such as a mirroring system, encounters some unexpected behavior or error, debug data collection may be required. Sometimes the root cause of the problem is at the remote site and not at the site that encountered the problem. In this case, a debug data collection from the remote site is necessary in order to get to the root cause of the problem.

For example, in a Peer to Peer Remote Copy (PPRC) system, a primary device at the local site could be suspended due to problems to a write to the secondary device at the remote site. In this case, the debug data analysis should be concentrated at the secondary device in order to understand the write failures. If the user or an automatic system that monitors the problematic events identifies an event, a generation of debug data at the remote site can be initiated. However, the user is not always at the site and an external system that monitors events can be cumbersome and requires additional software and hardware. If the debug data is not collected on time it may become obsolete and useless.

FIG. 1 depicts a system 100 for responsive acquisition of debug data. In the depicted embodiment, the system 100 includes a local device 102 and a remote device 104. The local device 102 and the remote device 104 may communicate data across a network 106. In a further embodiment, the system 100 may include an analyzer 112. The system is responsive, because the local device may collect a local debug data set 108 and the remote device may collect a remote debug data set 110 in response to an error within the system 100.

One example of the depicted system 100 may include a data storage system. In such an example, the local device 102 may collect data from client applications or workstations and store the data on a data storage device within or attached to the local device 102. If the system is configured for redundancy, the local device may transmit a copy of the data to the remote device 104 across a network 106.

The local device 102 may include a data storage server or subsystem. For example, the local device 102 may be an Enterprise® storage system available from International Business Machines® (IBM®). Alternatively, the local device 102 may include an application server or the like. Indeed, the local device may include any computing, communication, or data storage device capable of collecting a local debug data set 108 and generating a debug data collection command 114 to a remote device. The local device 102 may be considered local, because it may be geographically local to a system administrator. Conversely, the remote device 104 may be located at a geographically remote location. Such a system configuration may preserve data or system integrity. The added protection of geographically diverse locations for redundant systems may improve data or system reliability.

In one embodiment, an existing local device 102 or remote device 104 may be retrofitted or modified to generate the debug data collection command 114 or the acknowledgement 116. Such a modification may include an updated software, or firmware module. Alternatively, hardware in the local device 102 such as a data communication or monitoring card may be modified to generate the commands 114, 116. Alternatively, new local devices 102 or remote devices 104 may be designed to include this feature. In another embodiment, existing commands may be issued, but an alternative meaning may be assigned to the existing command. For example, the remote device 104 may be modified to assign new meaning to an existing command from the local device 102. In another possible embodiment, additional data may be added to an existing command to provide the additional information needed to trigger the remote device 104 to collect the remote debug data set 110. Such additional information may be packaged with an existing command.

The remote device 104 may include a second unit of the same type of device as the local device 102. For example, the remote device may be the same model of Enterprise® storage system available from International Business Machines® (IBM®). Alternatively, the remote device 104 may include a device that is compatible with the local device 102, such as a different model of the same general type of component. For example the remote device may include a different model of storage system. In yet another embodiment, the remote device 104 may include a device that is auxiliary to the local device 102. For example, the local device 102 may be an application server, and the remote device 104 may be a data storage server.

In such examples, the remote device 104 may additionally be configured to generate a debug data set 110. Although this debug data set 110 may be stored on the remote device 104, it is referred to as the remote debug data set 110 for consistency. If the remote device 104 receives a debug data collection command 114 from the local device 102, it may send an acknowledgement 116 back to the local device 102 across the network 106. Additionally, the remote device 104 may generate the remote debug data set 110 in response to receiving the debug data collection command 114.

The network 106 may include a Local Area Network (LAN), a Wide Area Network (WAN), a wireless network, a cellular data network, a satellite data communications network, or the like. In various embodiments, the network may include Radio Frequency (RF) communications, fiber optic communications, landline communications, and the like. In a further embodiment, the network 106 may include a Storage Area Network (SAN) configured to communicate storage data using Fibre Channel Arbitrated Loop (FC-AL) protocol, Small Computer System Interface (SCSI) protocol, or the like. In such embodiments, the network 106 may connect the local device 102 to the remote device 104. The local device 102 may communicate critical data and system commands over the network 106 to the remote device 104.

The local debug data set 108 and the remote debug data set 110 may include a file of data collected by a system diagnostic component. For example, the remote device 104 may include a self-diagnostic utility configured to collect system information such as system temperature, volume of memory utilized, utilized processing power, utilized hard disk space, or the volume of incoming data. In such an embodiment, the data may be stored in a debug data set 110. For example, the data may be stored in a data file designated for storing debug data collected by the utility.

In a further embodiment, the system 100 may additionally include an analyzer 112 configured to receive the local debug data set 108 and the remote debug data set 110 and diagnose the source of the system error. In one embodiment, the analyzer 112 is a separate component of the system 100. Alternatively, either the local device 102 or the remote device 104 or both may include an integrated analysis module 306 discussed in further detail below with respect to FIG. 3. In one embodiment, the network 106 may be the source of the system error. In such an embodiment, the remote device 104 may not receive the debug data collection command 114, and so may not generate the remote debug data set 110. In such an embodiment, the analyzer 112 may identify the network 106 as the source of the system error, because the lack of remote debug data may indicate a network communication error. In a further embodiment, the analyzer 112 may compare debug data stored in the debug data set with a set of expected values to identify a potential error source. Alternatively, the debug data sets 108, 110 may further include log files. The analyzer 112 may parse the log files to identify failed operations, communication error events, and the like. Passing both a local debug data set 108 and a remote debug data set 110 to the analyzer 112 may enable the analyzer 112 to gain a full system perspective on potential error sources.

Figure 2:
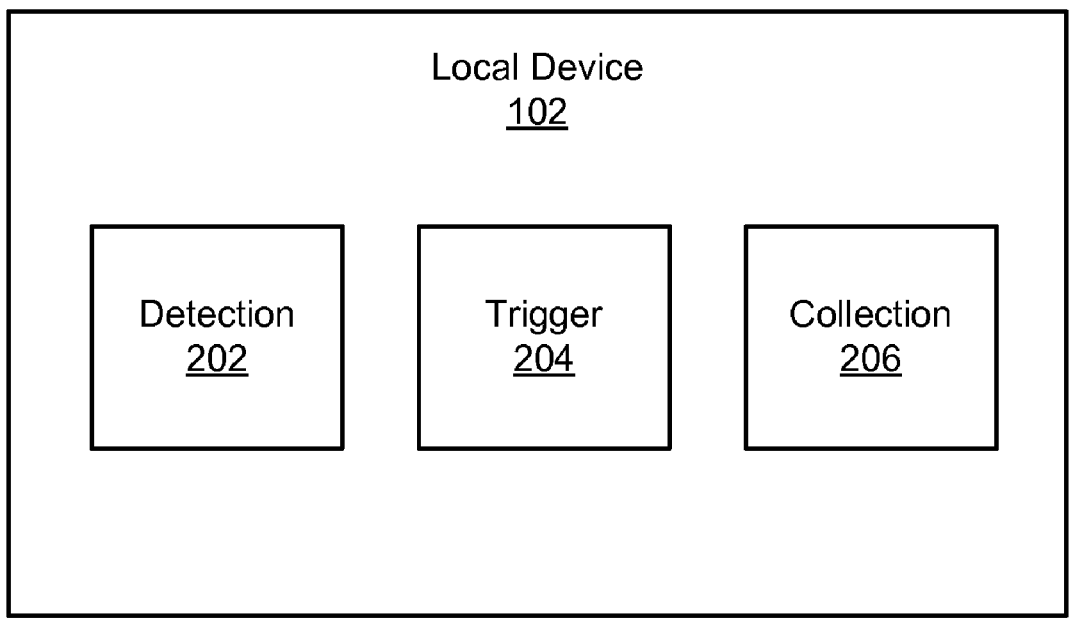
FIG. 2 is a schematic block diagram illustrating one embodiment of an apparatus for responsive acquisition of remote debug data.

FIG. 2 illustrates a further embodiment of the local device 102. In such an embodiment, the local device 102 may include a detection module 202, a trigger module 204, and a collection module 206. As discussed above, the local device 102 may include a storage device. In such an embodiment, the local device 102 may collect application data generated by applications hosted by application servers. The application servers may connect to the local device 102 and communicate application data to the local device 102 for long term storage. In certain further embodiments (not depicted), the local device 102 may include data communications module configured to receive application data from application servers, work stations, and the like.

In the depicted embodiment, the local device 102 includes a detection module 202. The detection module 202 may be configured to detect an error on a local device 102. For example, the detection module 202 may recognize a system suspend condition, wherein communications between the local device 102 and the remote device 104 are temporarily suspended because of an error. In an alternative embodiment, the detection module 202 may identify failed data communication attempts. For example, during normal operation, the local device 102 may transmit a group of data to the remote device 104 for backup. If the remote device 104 receives and successfully stores the data, the remote device 104 may so indicate to the local device 102. However, if the remote device 104 does not receive the data or does not successfully store the data, the remote device 104 will not indicate a successful store operation to the local device 102. In such an example, the detection module 202 may identify a system error.

The trigger module 204 may be coupled to the detection module 202. For example, the trigger module 204 may be coupled by internal data communication paths. Alternatively, the trigger module 204 and the detection module 202 may share common data registers, memory, or the like. The trigger module 204 may trigger the remote device 104 to generate the remote debug data set 110 in response to the detection module 202 identifying an error condition within the system 100. Further embodiments of the trigger module 204 are discussed with relation to FIG. 3 below.

The collection module 206 may also communicate with the detection module 202. In one embodiment, the collection module 206 may generate a local debug data set 108 in response to the error. For example, as described above with respect to the analyzer 112 above, the local device 102 may include a collection module 206. The collection module 206 may be configured to collect a local debug data set 108, which may include system status information, registry and memory information, error log information, and the like. The collection module 206 may then store the local debug data set 108 in a debug data set file.

Figure 3:
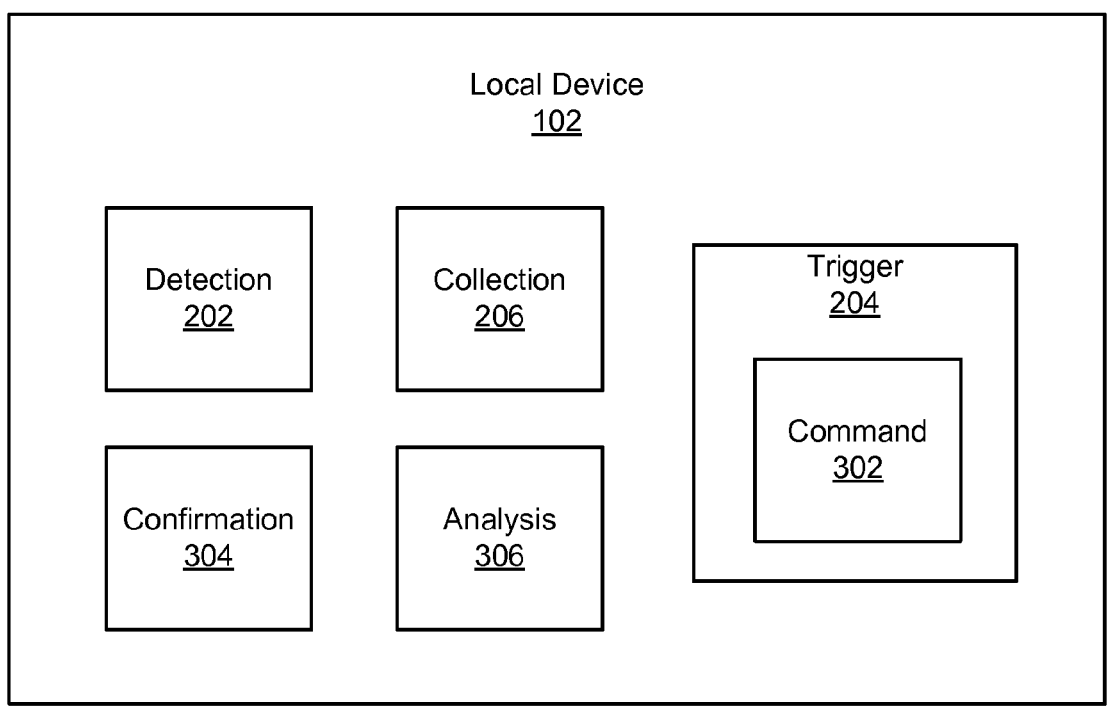
FIG. 3 is a detailed schematic block diagram illustrating another embodiment of an apparatus for responsive acquisition of remote debug data.

FIG. 3 illustrates a further embodiment of a local device 102. In the depicted embodiment, the local device 102 includes the detection module 202 and the collection module 206 substantially as described in relation to FIG. 2. In the present embodiment, the trigger module 204 includes a command module 302. In a further embodiment, the local device 102 may additionally include a confirmation module 304 and an analysis module 306.

In one embodiment, the command module 302 may issue a debug data collection command 114 to the remote device 104 to generate the remote debug data set 110. Certain embodiments of the debug data collection command 114 are described above with relation to FIG. 1. In one embodiment, the command module 302 may generate a predetermined series of signals, wherein the pattern of the signals may be uniquely identified by the remote device 104 as the debug data collection command 114. Additionally, the command module 302 may packetize the command in a network routable packet. The packet may include a header and/or footer, which contained address information identifying the remote device 104 as the destination device.

The local device 102 may additionally include a confirmation module 304. The confirmation module 304 may be configured to receive an acknowledgement 116 from the remote device 104. The acknowledgement 116 may indicate to the local device 102 that the remote device 104 has received the command 114 issued by the command module 302. In a further embodiment, the acknowledgement 116 may further indicate that the remote device 104 has started collecting the remote debug data set 110. Further, the acknowledgement 116 may indicate that the remote debug data set 110 has been successfully collected by the remote device 104. In a certain embodiment, the confirmation module 304 may include a network adapter configured to receive acknowledgements 116 across the network 106. Additionally, the confirmation module 304 may communicate with the collection module 206, and indicate to the collection module 206 that the remote device 104 has successfully received the debug data collection command 114. In such an embodiment the collection module 206 may initiate a process to collect the local debug data set 108.

In embodiment described above, the collection module 206 may wait for confirmation from the confirmation module 304 because the process for collecting the local debug data set may disable other modules and processes while the debug data set 108 is being collected. For example, if the confirmation module 304 does not receive an acknowledgement 116 from the remote device 104, the command module 302 may issue a second debug data collection command 114 to the remote device. However, if the collection module 206 had already initiated the debug data collection process, the command module 302 may not be able to issue the second command, and the opportunity to collect timely debug data on the remote device may be lost. However, this issue is resolved when the collection module 206 waits for the confirmation module 304 to indicate that it has received an acknowledgement 116.

In a further embodiment, the collection module 206 may include a timing feature. For example, the collection module 206 may wait a predetermined amount of time to initiate the process for collecting the local debug data set 108. For example, the collection module 206 may wait up to two seconds for the confirmation module 304 to indicate that it has received an acknowledgement 116 from the remote device. If the confirmation module 304 does not so indicate within the two seconds, the collection module 206 may initiate the collection process anyway. Such an embodiment enables the local device to collect the local debug data set 108 in a timely manner, even when the remote device is unreachable or unresponsive.

In a one embodiment, the local device 102 may additionally include an analysis module 306. In such an embodiment, the analysis module 306 may analyze the local debug data set 108. Additionally, if the analysis module 306 is able to obtain the remote debug data set 110 from the remote device 104, the analysis module 306 may analyze the remote debug data set 110. In such an embodiment, the analysis module 306 may analyze the data sets 108, 110 to determine a cause of the error. Embodiments of the analysis process are described above with relation to the analyzer 112 of FIG. 1. The analysis module 306 may operate in substantially the same way as an analyzer 112. In a particular embodiment, the analysis module 306 on the local device 102 may operate as the analyzer 112 for the system 100.

Figure 4:
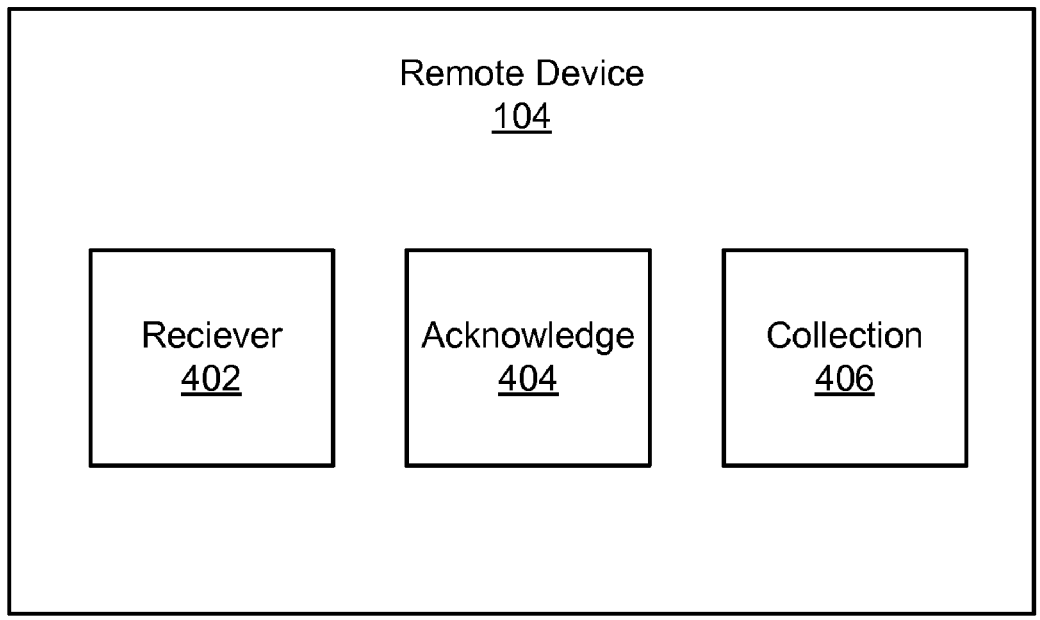
FIG. 4 is a schematic block diagram illustrating another embodiment of an apparatus for responsive acquisition of remote debug data.

FIG. 4 illustrates one embodiment of a remote device 104. The remote device 104 may include a receiver module 402, an acknowledgement module 404, and a collection module 406. The receiver module 402 may receive the debug data collection command 114 issued by the command module 302 of the local device 102. Alternatively, the receiver module 402 may receive a flag, trigger, or other indicator from the local device 102 indicating that the remote device 104 should collect the remote debug data set 110.

In such an embodiment, the acknowledgment module 404 may send an acknowledgement 116 to the local device 102. For example, the acknowledgement module 404 may send the acknowledgement 116 in response to an indication from the receiver module 402 that the remote device 104 has received a debug data collection command 114 from the local device 102. The acknowledgement 116 may include a series of data signals configured to indicate that the remote device 104 has received the debug data collection command 114. Alternatively, the acknowledgement may indicate that the remote device 104 has initiated or successfully completed the remote debug data collection process.

The collection module 406 may collect the remote debug data set 110. In a certain embodiment, the collection module 406 may initiate the collection process in response to the receiving module 402 receiving the debug data collection command 114. In a further embodiment, the collection module 406 may wait for the acknowledgement module 404 to send the acknowledgement 116 to the local device 102 before initiating the collection process.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
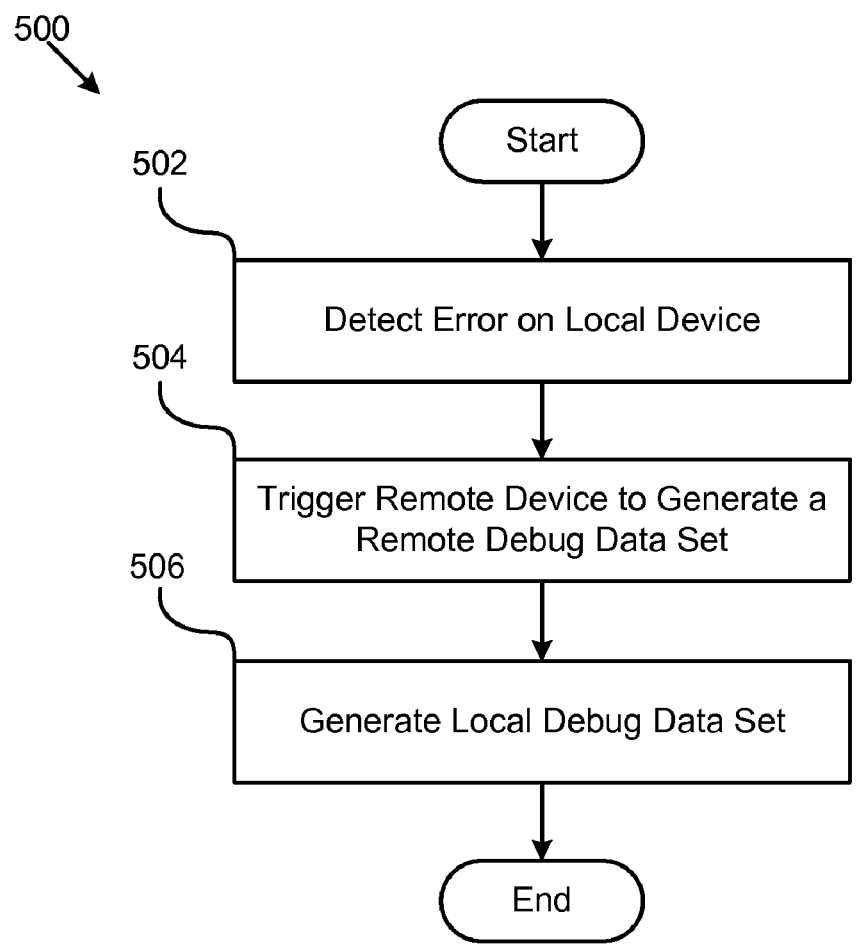
FIG. 5 is a schematic flow chart diagram illustrating one embodiment of a method for responsive acquisition of remote debug data.

FIG. 5 illustrates one embodiment of a method 500 for responsive acquisition of remote debug data. In the depicted embodiment 500, the method starts when the detection module 202 detects 502 an error on the local device 102. In response to the detection module 202 detecting 502 the error, the trigger module 204 may trigger 504 the remote device 104 to generate a remote debug data set 110. Additionally, the collection module 206 on the local device 102 may generate 506 a local debug data set 108, and the method 500 ends.

Figure 6:
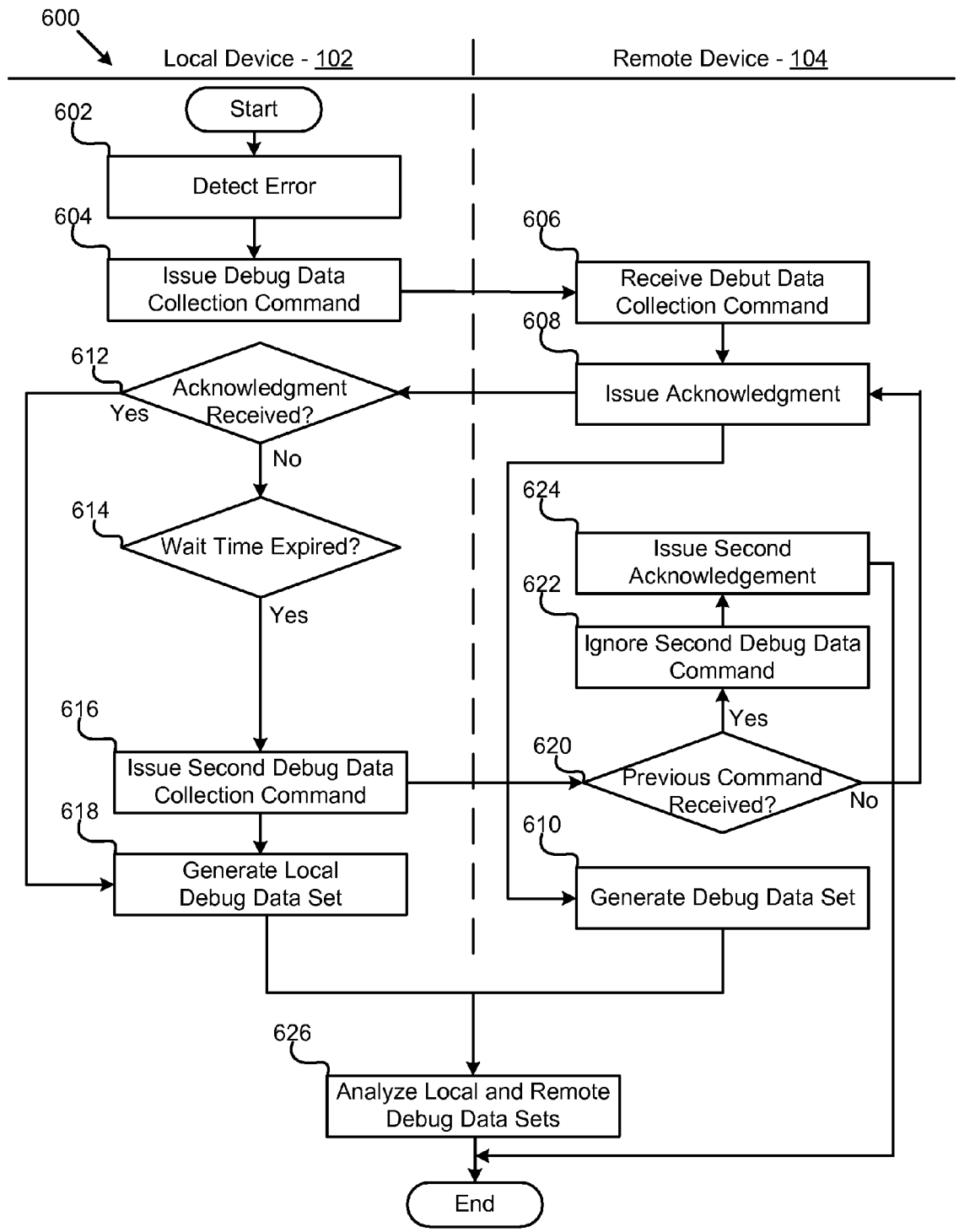
FIG. 6 is a detailed schematic flow chart diagram illustrating one embodiment of a method for responsive acquisition of remote debug data.

FIG. 6 illustrates a further embodiment of a method 600 for responsive acquisition of remote debug data. The method 600 may start when the detection module 202 on the local device 102 detects 602 an error. The command module 302 on the local device 102 may then issue 604 a debug data collection command 114 to the remote device 104.

In a further embodiment, the receiver module 402 on the remote device 104 may receive 606 the debug data collection command 114 from the local device. The acknowledgement module 404 issues 608 an acknowledgement 116 to the local device 102, and the collection module 406 on the remote device 104 may generate 610 the remote debug data set 110.

In a further embodiment, the confirmation module 304 on the local device 102 may wait 612 for the acknowledgment 116. If the confirmation module 304 receives 612 the acknowledgement, the collection module 206 on the local device 102 may generate 618 the local debug data set 108. If the confirmation module 304 does not receive 612 the acknowledgement 116, the command module 302 may determine 614 whether a predetermined wait time has expired. If it has expired 614, the command module 302 may issue 616 a second debug data collection command 114 to the remote device 104.

If the receiver module 402 of the remote device 104 receives the second debug data command 114, it may determine 620 whether it has previously received a command 114 from the local device 102. If it has received 620 a previous command 114 from the local device 102, the remote device 104 may ignore 622 the second command 114 and the acknowledgement module 404 may issue 624 a second acknowledgement 116 to the local device 102 to indicate to the local device 102 that the remote device 104 has received 620 the debug data collection command 114 and has started generating 610 the remote debug data set 110.

In a further embodiment, the analyzer 112 may obtain the local debug data set 108 and the remote debug data set 110. Alternatively the analysis module 306 on the local device 102 may obtain the data sets 108, 110. The analyzer 112 or the analysis module 306 may then analyze 626 the local debug data set 108 and the remote debug data set 110 to determine the source of the error and the method 600 ends. In a further embodiment, the analyzer 112 may indicate the source of the error to a system administrator, or initiate an automated error correction or recovery process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for responsive acquisition of remote debug data, the apparatus comprising:
    a memory device storing executable code;
    a processor executing the executable code, the executable code comprising
        a detection module detecting an error on a local device;
        a trigger module in communication with the detection module, the trigger module triggering a remote device to generate a remote debug data set in response to the error;
        a collection module in communication with the detection module, the collection module generating a local debug data set in response to the error; and
        an analysis module analyzing the local debug data set and the remote debug data set to determine a cause of the error.

2. The apparatus of claim 1, wherein the trigger module further comprises a command module issuing a debug data collection command to the remote device to generate the remote debug data set.

3. The apparatus of claim 2, further comprising a confirmation module in communication with the collection module, the confirmation module receiving an acknowledgement from the remote device, wherein the acknowledgement confirms that the remote device has received the debug data collection command.

4. The apparatus of claim 3, the command module further issuing a second debug data collection command to the remote device in response to a determination that the confirmation module has not received an acknowledgment from the remote device within a predetermined time interval.

5. The apparatus of claim 3, the collection module further generating the local debug data set in response to one of:
    a determination that the confirmation module has received an acknowledgment from the remote device; and
    a determination that a predetermined delay has expired.

6. An apparatus for responsive acquisition of remote debug data, the apparatus comprising:
    a memory device storing executable code;
    a processor executing the executable code, the executable code comprising
        a receiver module receiving a debug data collection command from a remote device, the remote device generating a remote debug data set;
        an acknowledgement module in communication with the receiver module, the acknowledgment module sending an acknowledgement to the remote device, wherein the acknowledgment confirms that the receiver module has received the debug data collection command;

a collection module in communication with the receiver module, the collection module generating a local debug data set in response to the debug data collection command; and an analysis module analyzing the local debug data set and the remote debug data set to determine a cause of an error.

7. A system for responsive acquisition of remote debug data, the system comprising:
　a local device:
　　detecting an error on the local device;
　　triggering a remote device to generate a remote debug data set in response to the error, wherein triggering further comprises issuing a debug data collection command to the remote device to generate the remote debug data set; and
　　generating a local debug data set in response to the error; and
　a remote device in communication with the local device, the remote device
　　receiving a debug data collection command from the local device;
　　sending an acknowledgement to the local device, wherein the acknowledgment is configured to confirm that the remote device has received the debug data collection command; and
　　generating the remote debug data set in response to the debug data collection command; and
　an analysis module analyzing the local debug data set and the remote debug data set to determine a cause of the error.

8. The system of claim 7, wherein at least one of the debug data collection command and the acknowledgment are communicated between the local device and the remote device over a network.

9. The system of claim 8, the local device further receiving an acknowledgement from the remote device, wherein the acknowledgement confirms that the remote device has received the debug data collection command.

10. The system of claim 9, the local device further issuing a second debug data collection command to the remote device in response to a determination that the local device has not received an acknowledgment from the remote device within a predetermined time interval.

11. The system of claim 9, the local device further generating a local debug data set in response to one of:
　a determination that the local device has received an acknowledgment from the remote device; and
　a determination that a predetermined delay has expired.

12. A method for responsive acquisition of remote debug data, the method comprising:
　detecting, by use of a processor, an error on a local device;
　triggering a remote device to generate a remote debug data set in response to the error;
　generating a local debug data set in response to the error; and
　analyzing the local debug data set and the remote debug data set to determine a cause of the error.

13. The method of claim 12, wherein triggering further comprises issuing a debug data collection command to the remote device to generate the remote debug data set.

14. The method of claim 13, the method further comprising receiving an acknowledgement from the remote device, wherein the acknowledgemen confirms that the remote device has received the debug data collection command.

15. The method of claim 14, further comprising issuing a second debug data collection command to the remote device in response to a determination that the local device has not received an acknowledgment from the remote device within a predetermined time interval.

16. The method of claim 14, further comprising generating a local debug data set in response to one of:
　a determination that the confirmation module has received an acknowledgment from the remote device; and
　a determination that a predetermined delay has expired.

17. The method of claim 13, further comprising:
　receiving the debug data collection command on the remote device;
　sending an acknowledgement to the local device, wherein the acknowledgment is confirms that the remote device has received the debug data collection command; and
　generating the remote debug data set in response to the debug data collection command.

* * * * *